United States Patent [19]

Kobayashi

[11] Patent Number: 4,860,000
[45] Date of Patent: Aug. 22, 1989

[54] DATA TRANSMISSION SYSTEM USING SENDING RIGHT REQUEST SIGNAL TRANSFERRED THROUGH LOOP TRANSMISSION PATH

[75] Inventor: Koji Kobayashi, Kanagawa, Japan

[73] Assignee: Yamatake-Honewell Co., Ltd., Tokyo, Japan

[21] Appl. No.: 270,457

[22] Filed: Nov. 4, 1988

Related U.S. Application Data

[63] Continuation of Ser. No. 922,281, Oct. 23, 1986, abandoned.

[30] Foreign Application Priority Data

Oct. 25, 1985 [JP] Japan ................. 60-237606
Jun. 10, 1986 [JP] Japan ................. 61-132625
Jun. 10, 1986 [JP] Japan ................. 61-132626
Jun. 10, 1986 [JP] Japan ................. 61-132627
Jun. 10, 1986 [JP] Japan ................. 61-132628

[51] Int. Cl.$^4$ .................. H04Q 9/00; G06F 13/00; H04J 3/06
[52] U.S. Cl. .................. 340/825.5; 340/825.05; 370/89; 370/86; 370/92
[58] Field of Search .......... 340/825.05, 825.5, 825.51; 370/85, 86, 89, 92, 94, 93; 364/200

[56] References Cited

U.S. PATENT DOCUMENTS

| | | | |
|---|---|---|---|
| 4,295,122 | 10/1981 | Hatada et al. | 340/825.5 |
| 4,439,856 | 3/1984 | Ulug | 340/825.5 |
| 4,470,110 | 9/1984 | Chiarottino et al. | 370/85 |
| 4,472,712 | 9/1984 | Ault et al. | 340/825.5 |
| 4,590,468 | 5/1986 | Stieglitz | 340/825.5 |
| 4,593,280 | 6/1986 | Grow | 370/86 |
| 4,642,630 | 2/1987 | Beckner et al. | 340/825.5 |
| 4,675,671 | 6/1987 | Ishizuka et al. | 370/86 |

Primary Examiner—Robert L. Griffin
Assistant Examiner—Ralph E. Smith
Attorney, Agent, or Firm—Blakely, Sokoloff, Taylor & Zafman

[57] ABSTRACT

A data transmission system comprising a unidirectional loop transmission path to which a plurality of communication equipment are coupled. Each communication equipment operates to relay and send a signal including a data signal received from other communication equipment located upstream to those located downstream via the transmission path. An arbitrary communication equipment which requests for the sending right adds a code indicating a priority level of the sending right to a sending right request signal and sends this code-added sending right request signal. Each communication equipment includes a circuit which delays the received signal by a predetermined time shorter than a frame time and sends the signal thus delayed. In this manner, when an arbitrary communication equipment requests the sending right, the circuit operates to compare the received priority level code with the priority level code assigned to itself to send the priority level code assigned to itself instead of the received priority level code when the priority level assigned to itself is higher than that of the code of the received signal.

15 Claims, 11 Drawing Sheets

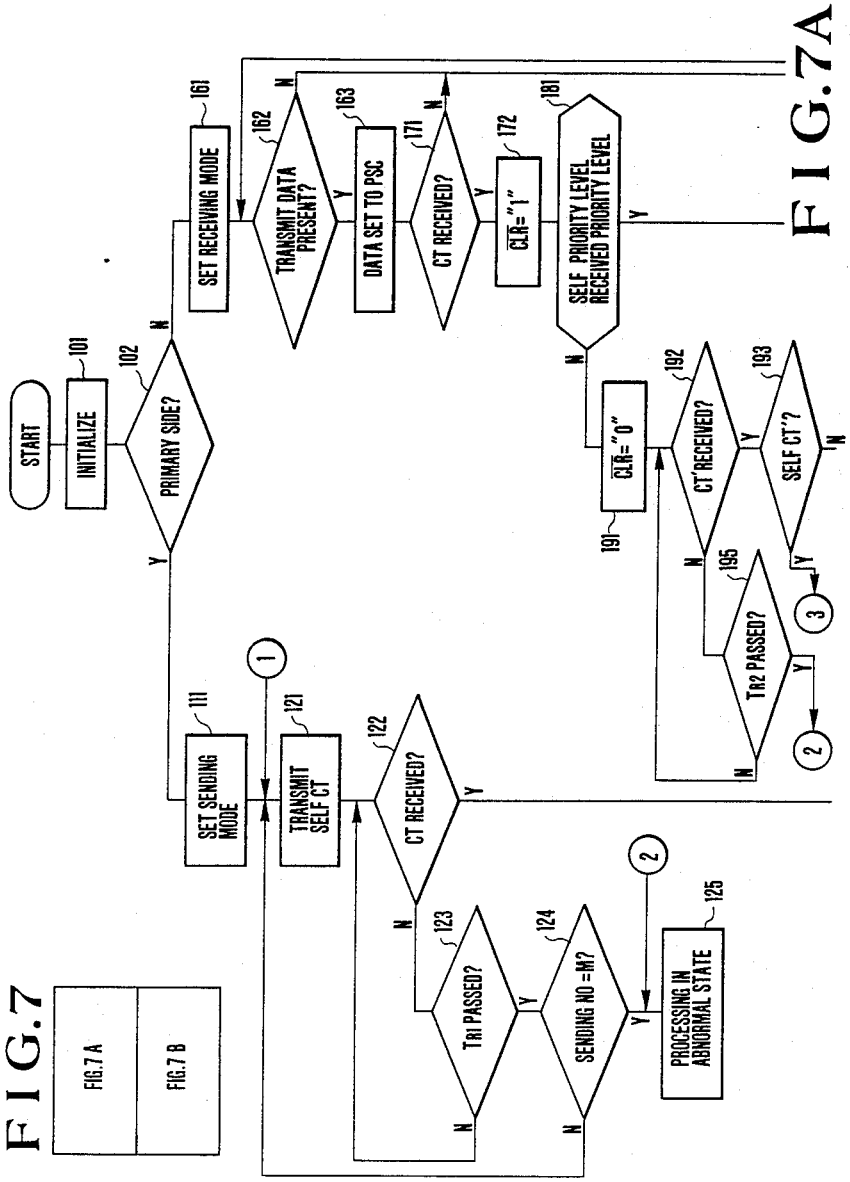

DATA TRANSMISSION SYSTEM USING SENDING RIGHT REQUEST SIGNAL TRANSFERRED THROUGH LOOP TRANSMISSION PATH

This is a continuation of application Ser. No. 922,281 filed Oct. 23, 1986, now abandoned.

BACKGROUND OF THE INVENTION

The present invention relates to a transmission system applied to transmission and relaying of sending right request signal between a plurality of communication equipment connected in the form of a loop.

In LANs (Local Area Networks) or various private control equipment etc., there has been employed a transmission system described below which has been already proposed as the Japanese patent application No. 260800/84 assigned to the same applicant as the present application. According to this transmission system, a plurality of communication equipment which perform transmission and reception of data are interconnected by means of a loop transmission path, whereupon the transmission direction of a data signal is determined in advance. During transmission by any communication equipment which has acquired or possessed the sending right, other communication equipments relay a signal received from one side of the transmission path to the other side of the transmission path. When newly possessing the sending right in response to the completion of the transmission, the communication equipment which requests for the sending right adds a code indicating the priority level of the sending right to a sending right request signal generally called a "Token" and transmits the code added signal. Thus, the communication equipment which has the highest priority level among the entire communication equipments will acquire the sending right.

In the prior art, however, the decision as to whether each communication equipment should relay and transmit a received signal or should receive the received signal by itself and the decision as to whether when receiving the sending right request signal, each communication equipment should acquire the sending right by itself or should relay and transmit the sending right without possessing it are conducted after all signals have been received. Accordingly, when the received signal should be relayed and transmitted, a predetermined time required until such decisions are established is added per each communication equipment. This results in the problem that delay time required for decision is increased, particularly when the sending right request signal is transmitted.

SUMMARY OF THE INVENTION

With the above in view, a principal object of the present invention is to provide a high speed and high reliability data transmission system using a sending request signal transferred through a loop transmission path.

Another object is to provide a sending right request signal transmission system which can reduce time required for relaying of a data signal and for switchover transmission of the priority right request signal to much extent.

A further object of the present invention is to provide a sending right request signal transmission system in which the entire transmission speed can be improved.

A still further object is to provide a sending right transfer system which can perform transfer of the sending right and/or confirm acquisition thereof by the minimum signal transmission and reception, resulting in high speed data transmission and high response in the execution of control required for data transmission.

A still further object is to provide a sending right transfer system which can abandon and acquire the sending right, and confirm abandonment and acquisition thereof by the minimum signal transmission and reception.

To achieve these objects, the present invention provides a data transmission system comprising a unidirectional loop transmission path to which a plurality of communication equipment are coupled, each communication equipment operating to relay and send a signal including a data signal received from other communication equipment located upstream to those located downstream via the transmission path, an arbitrary communication equipment which requests for the sending right operating to add a code indicating a priority level of the sending right to a sending right request signal and send the sending right request signal to which the priority level code has been added, characterized in that each communication equipment includes circuit means which delays the received signal by a predetermined time(i.e., the time for transmitting a signal representing a priority as a series of bits) shorter than a frame time and sends the signal thus delayed, and in that when an arbitrary communication equipment requests for the sending right, the circuit means operates to compare the received priority level code with the priority level code of the arbitrary communication equipment itself to send the priority level code of said arbitrary communication equipment itself instead of the received priority level code when the priority level of the code of the arbitrary communication equipment itself is higher than that of the code of the received signal.

The circuit means may comprises a delay element to perform the delaying function thereof, an output of the delay element being connected to the transmission path routed to the communication equipment located downstream, and a switchover circuit responsive to a control signal when the priority level of the arbitrary communication equipment itself is higher than that of the code added to the received signal to switch said output of the delay element to a sending output of said arbitrary communication equipment itself to connect the sending output to the transmission path routed to the communication equipment located downstream.

Thus, a received signal only undergoes at least the predetermined time shorter than a frame time by the delay element provided in each communication equipment and the received signal is transmitted to the transmission path on the side of the transmission through the switch. As a result, the delay time due to relaying is reduced, and when the priority assigned to each communication equipment is higher than the priority of the received transmission right request signal, the switch is controlled, so that the sending output of each communication equipment is connected to the transmission path on the side of the transmission. Thus, the code indicating the priority assigned to itself is transmitted and the subsequent transmission is conducted from the communication equipment which has sent the priority level code assigned to itself. Thus, high speed transmission of the sending right request signal is realized.

Further, the data transmission system according to the present invention may be advantageously implemented as a sending right transfer system as follows. Namely, when a received sending right request signal is different from that of the communication equipment itself which has already possessed the sending right, this communication equipment sends a transfer designation signal indicating a communication equipment which will next acquire the sending right in accordance with the sending right request signal, and other communication equipment relay and send the transfer designation signal and the communication equipment which will next possess the sending right responds to reception of the transfer designation signal to possess the sending right. This system ensures high speed transfer of the sending right. In accordance with another aspect of the sending right transfer system, when a received sending right request signal is different from that of the communication equipment itself which has already possessed the sending right, this communication equipment not only sends the above-mentioned transfer designation signal but also abandons the sending right after said transfer designation signal is sent. Responding to this, other communication equipments relay and send the transfer designation signal, and identify a communication equipment which will next possess the sending right. Thus, the communication equipment which will next possess said sending right responds to reception of the transfer designation signal to actually acquire the sending right. This modified sending transfer system can securely perform the confirmation of the transfer of the sending right and acquisition thereof at a high speed as well. In accordance with a further aspect of the sending right transfer system, the communication equipment having received a sending right which is not assigned to itself abandons the sending right after the transfer designation signal is sent in the same manner as in the above-mentioned modified system. At this time, other communication equipments relay and send the transfer designation signal, and the communication equipment which will next possess the sending right responds to reception of the transfer designation signal to send an identification signal. Thus, the above other communication equipments relay and send the identification signal and identify the communication equipment which has possessed the sending right. This system can perform confirmation of acquisition of the sending right by using the confirmation signal.

BRIEF DESCRIPTION OF THE DRAWINGS

In the drawings,

FIGS. 7a and 7b are a flow chart showing the whole operation of a data transmission system according to the present invention.

DETAILED DESCRIPTION OF THE PREFERRED EMBODIMENTS

The present invention will be described in detail in connection with preferred embodiments with reference to attached drawings.

Figure 1:
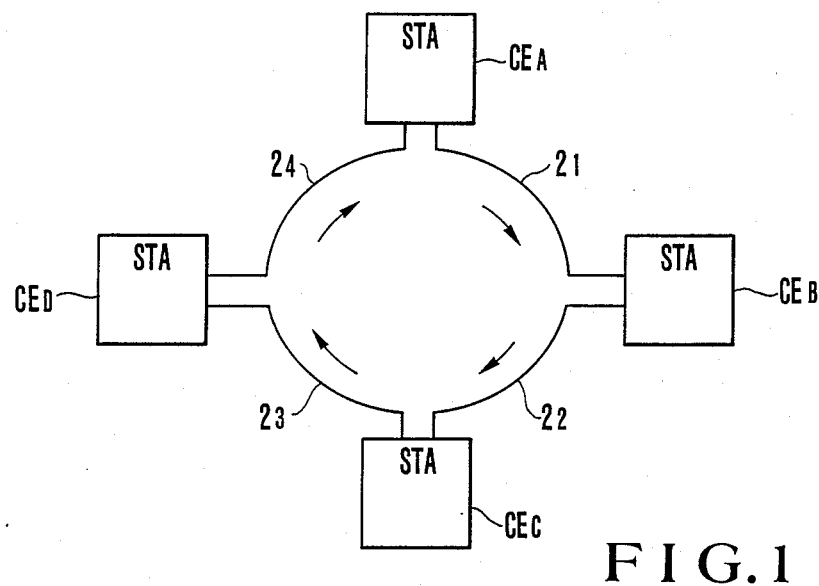
FIG. 1 is a block diagram schematically illustrating the whole structure of a data communication system to which the present invention is applied.

FIG. 1 is a block diagram schematically illustrating the whole structure of a data communication system to which the present invention is applied. A plurality of communication equipment or data stations (which will be called "STAs" hereinafter) $CE_A$ to $CE_D$ are interconnected by transmission paths $2_1$ to $2_4$ in the form of a loop. In this example, a signal is transmitted in a direction indicated by arrows. or example, when the STA $CE_A$ acquires the sending right and is transmitting a signal to the STA $CE_D$, the intermediate STAs $CE_B$ and $CE_C$ relay and transmit the received signal to the STA $CE_D$, respectively.

Figure 2:
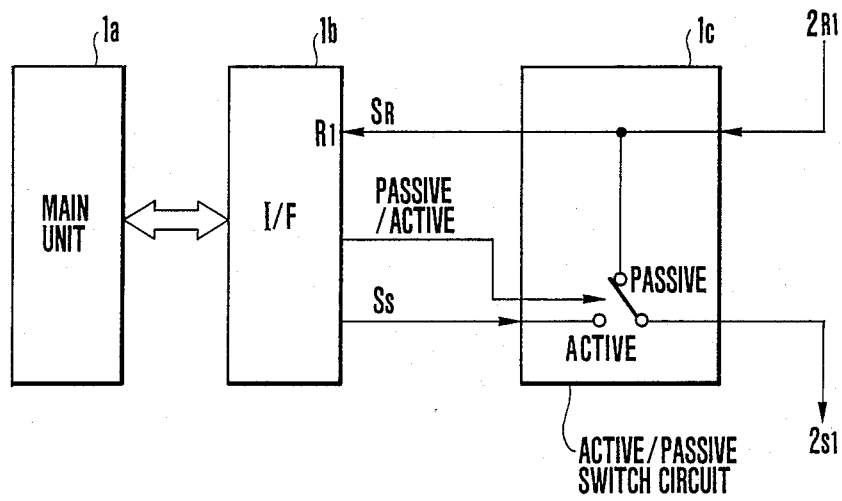
FIG. 2 is a block diagram schematically illustrating a circuit configuration of a main part and an interface associated therewith in each communication equipment to which a transmission system according to the invention is applied.

FIG. 2 is a block diagram schematically illustrating the internal circuit configuration of each STA CE shown in FIG. 1. As seen from this figure, the STA CE includes a main unit 1a and an interface (which will be called an "I/F" hereinafter) 1b and an ACTIVE/PASSIVE SWITCH circuit 1c. To a reception input $R_1$ of the IF 1b, one transmission path $2R_1$ is connected. Between the transmission path 2R and the other transmission path $2S_1$, a D-type flip-flop circuit (which will be shown in FIG. 3 and be called a "FFC" hereinafter) 11 serving as a delay element are provided when an active mode of the SWITCH circuit 1c is selected. In response to a clock pulse CLK signal synchronized with a received signal $S_R$, which is delivered from I/F 1b to a clock terminal CK of the FFC 11, the FFC 11 holds the received signal $S_R$ delivered to a data terminal thereof bit by bit to output it from an output Q thereof. This renders the delay corresponding to substantially one bit to the received signal and transmits the received signal thus delayed to the transmission path 2S as a transmission signal $S_S$.

In the example here, a D-type flip-flop is mentioned for the purpose of materializing a delay of nearly one bit but arrangements may be made to materialize delays other than that of one bit, such as those of half a bit and eight bits, in which cases register circuits suitable to such delays are to be used. In view of the principle of operation of the present invention, it should be clear, therefore, that a delay suffices as long as it is that of less than one frame length.

The output Q of the FFC 11 is connected to the transmission path 2S through a switch SW. When the I/F 1b produces a control signal $S_C$, the switch SW responds to this control signal $S_C$ to switch the output Q of the FFC 11 to a sending output SO of the I/F1b to connect the sending output SO to the transmission path 2S. Thus, a signal from the I/F 1b is transmitted to the transmission path 2S.

Figure 3:
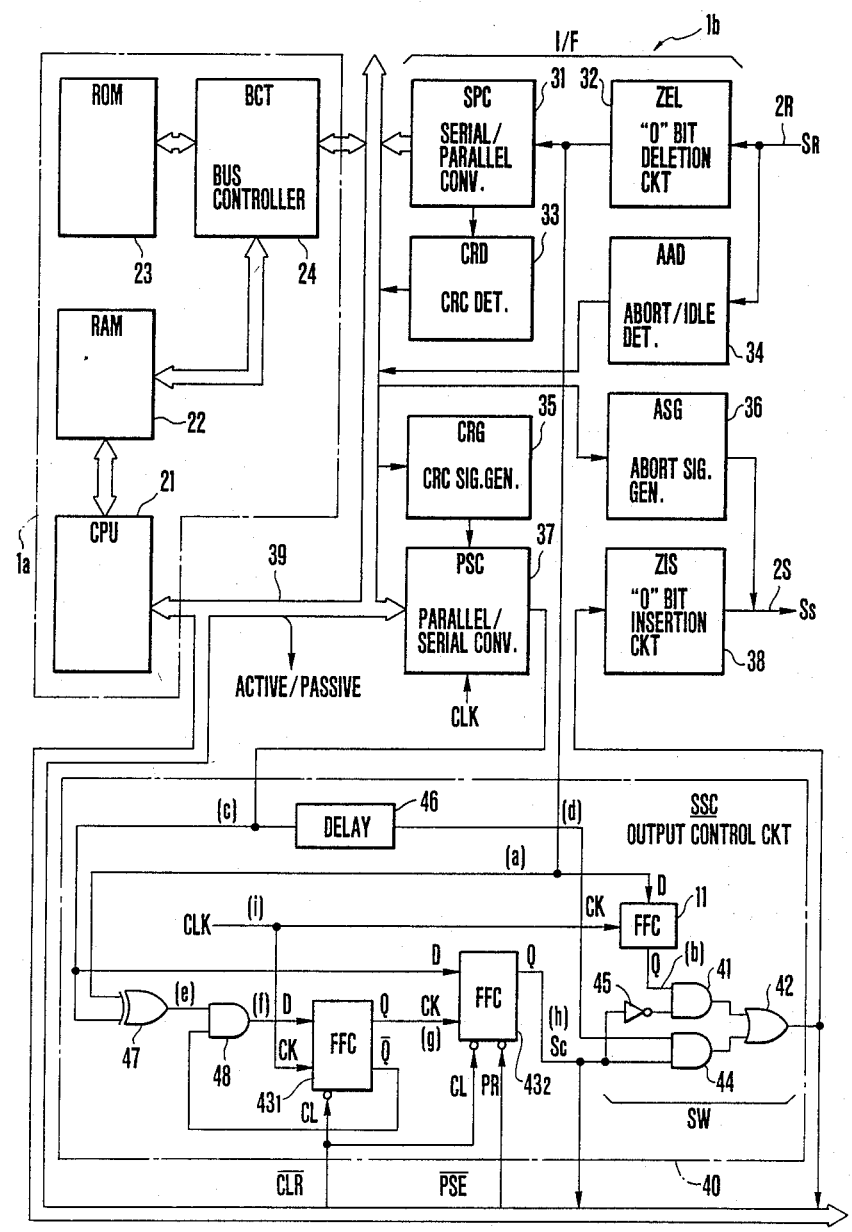
FIG. 3 is a block diagram illustrating the detail of the circuit configuration shown in FIG. 2.

FIG. 3 is a block diagram illustrating details of the main unit 1a, the I/F 1b. The main unit 1a includes a processor (which will be abbreviated as a "CPU" hereinafter) 21 such as a microprocessor, a variable memory (which will be abbreviated as a "RAM" hereinafter) 22, a fixed memory (which will be abbreviated as a "ROM" hereinafter) 23, and a bus controller (which will be abbreviated as "BCT" hereinafter) 24. The I/F 1b includes a serial-to-parallel converter (which will be abbreviated as a "SPC" hereinafter) 31 such as a shift register, a "0" bit deletion circuit (which will be abbreviated as a "ZEL" hereinafter) 32, CRC (Cyclic Redundancy Check) detector (which will be abbreviated as a "CRD" hereinafter) 33, an Abort./idle detector (which will be abbreviated as an "AAD" hereinafter) 34, a CRC signal generator (which will be abbreviated as a "CRG" hereinafter) 35, an Abort. signal generator (which will be abbreviated as an "ASG") 36, a parallel-to-serial converter (which will be abbreviated as a "PSC" hereinafter) 37, and a "0" bit insertion circuit (which will be abbreviated as a "ZIS" hereinafter) 38.

The communication equipment shown in FIG. 1 further comprises an output control circuit (which will be abbreviated as a "SSC" hereinafter) 40 including the FFC 11 and the switch SW. As shown in FIG. 3, the switch SW comprises two AND gates 41 and 44, an OR gate 42, and an inverter 45. The SSC 40 further includes a delay circuit 46, two flip-flop circuits (FFCs) $43_1$ and $43_2$, an exclusive-OR (which will be abbreviated as an "EXOR" hereinafter) gate 47, and an AND gate 48 and functions of these components will be described in detail later. In addition, the main units 1a, the interface 1b and the SSC 40 mentioned above are connected by means of an internal bus 39.

In the communication equipment thus configured, the ZEL 32 deletes "0" bit from the received signal $S_R$ sent from the transmission path 2R in accordance with the HDLC frame format such as JIS C 6363. The received signal from which "0" bit is thus deleted is converted into parallel data in the SPC 31 and then is delivered to the CPU 21 through the internal bus 39. Thus, the CPU 21 executes an instruction in the ROM 23 through the BCT 24 and makes a judgement of the received data and an judgement on control while providing an access of a predetermined data to the RAM. Depending upon these judgement processings the CPU 21 controls the CRG 35 and the ASG 36 according to need and delivers the transmission data in a parallel form to the PSC 37.

As a result, in the PSC 37, the transmission data is converted into serial data and the CRC signal is attached thereto. The serial data with the CRC signal is delivered through the SSC 40 to the ZIS 38. In ZIS 38, "0" bit is inserted into the data delivered through the SSC 40 in accordance with the above-described HDLC frame format and when transmission is interrupted according to need, an abort signal from the ASG 36 is inserted thereinto. Then, the data signal thus processed is transmitted to the transmission path 2S as the transmission signal $S_S$.

The received signal $S_R$ is also delivered to the AAD 34. In accordance with the detection output of the AAD 34 and an output indicative of checked result of the CRD 33, the CPU 21 effects a predetermined control. In addition, depending upon the control condition, the received data from the SPC 31 is directly stored in the RAM 22 through the BCT 24 or the content of the RAM 22 is directly output to the PSC 37 on the basis of DMA (Direct Memory Access) control.

The output of the ZEL is delivered to the data terminal D of the FFC 11 included in the SSC 40. The output of the FFC 11 is input to the ZIS 38 through the AND gate 41 and the OR gate 42. In normal condition, i.e., in the receiving mode, a clear signal CLR is delivered to clear terminals $CL_S$ of the $FFC_S$ $43_1$ and $43_2$ by the CPU 21 through the internal bus 39, so that these $FFC_S$ $43_1$ and $43_2$ are in reset state. Accordingly, the output Q of the FFC $43_2$ represents logical "0", with result that the AND gate 44 is off and the inverter 45 has an output of logical "1". Thus, since the AND gate 41 is on, the signal from the output Q of the FFC 11 is delivered to the ZIS 38 in the same manner as in FIG. 2, and the signal delivered to the ZIS is transmitted as the transmission signal $S_S$.

In contrast to the above, when the communication equipment itself shown in FIG. 3 has acquired the sending right, the CPU 21 delivers a present signal $\overline{PSE}$ to a preset terminal PR of the FFC $43_2$. As a result, the FFC $43_2$ is set, so that its output Q becomes "0". Thus, the AND gate 44 is turned on and the output of the inverter 45 becomes "0". For this reason, the AND gate 41 is cut off, causing a signal from the delay circuit 46 to be delivered to the input of the ZIS 38 through the AND gate and the OR gate 42 instead of the output Q of the FFC 11. Thus, the operation mode shifts to sending mode for transmitting a signal to the transmission path 2S.

On the other hand, when the CPU 21 has decided that the request for the sending right should be issued, it sets to the PSC 37 a sending right request signal including codes comprising in combination "1" and "0" indicating the priority level of the sending right. Accordingly, the contents of the sending right request signal thus set are bitwise output as serial data in correspondence with the clock pulse CLK signal and then are delivered to the EXOR gate 47.

Namely, when the CPU has decided that the reception of the sending right request signal should be initiated, it sets to the PSC 37 transmission data including the code indicating the priority level of the sending right request of this communication equipment before codes indicating the priority level of other communication equipment are received.

Accordingly, when the output of the ZEL 32 includes a received similar code indicating the priority level, this code is delivered to the other input of the EXOR gate 47. When there holds the condition that the output of the ZEL 32 represents "0" and the output of the PSC 37 represents "1", the output of the EXOR gate 47 becomes "1". This output of "1" is delivered to the data terminal D of the FFC $43_1$ through the AND gate 48. Thus, the FFC $43_1$ is set in correspondence with the clock pulse CLK signal. In response to this, the FFC $43_2$ is also set, with the result that the output Q becomes "1". In the same manner as stated above, the AND gate 44 is turned on and the output of the PSC 37 which is delayed by the delay circuit 46 is output as the transmission signal $S_S$.

These operations stated above will be described in greater detail later. The output Q of the FFC $43_2$ and the output of the OR gate 42 are delivered to the CPU 21 through the bus 39. This permits the CPU 21 to judge whether or not the transmission data assigned to this communication equipment itself which has been set by the CPU 21 is transmitted.

Figure 4:
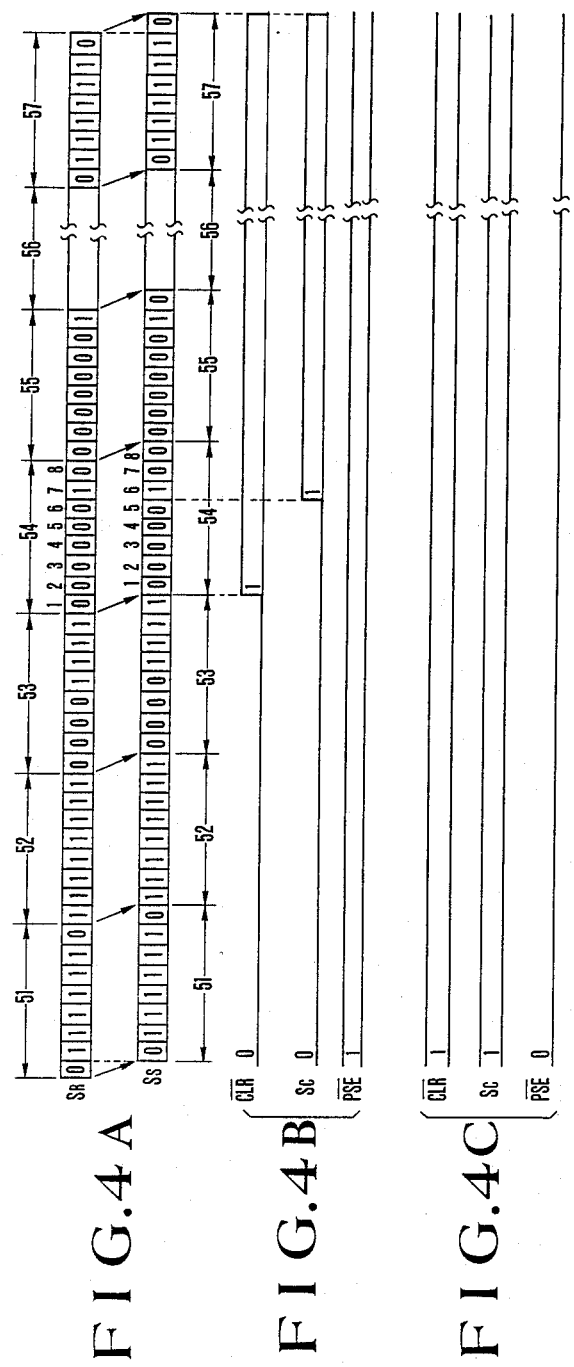
FIG. 4A shows a configuration of a transmission right request signal employed in the present invention.
FIGS. 4B and 4C show timing charts of a clear signal, a control signal and a preset signal employed in the present invention.

FIG. 4(A) shows an example of contents of the sending right request signal in the above-mentioned operation mode. This signal has a format comprising a start flag 51 of 8 bits, a global code 52 of 8 bits indicating that reception should be carried out in all the stations STA, a sending right request code 53 of 8 bits, a priority level code 54 of 8 bits, a transmission source code 55 of 8 bits indicating an address of the ST which has performed transmission, a CRC signal 56, and an end flag 57 of 8 bits. When the received signal $S_R$ is in the condition as shown, the priority level code 54 represents "2" in a binary form and the priority level added at the STA of the transmission source, which is represented by "00000010", is II.

On the other hand, the sending right request signal that each ST itself should transmit as the transmission signal is the same as the received signal $S_R$ in connection with the start flag 51, the global code 52, the sending right request code 53, and the end flag 57, and only differs from the latter in connection with the priority level code 54, the transmission source code 55 and the CRC signal 56. In this example, since the priority level represents "4" in a binary form, the priority level IV of the concerned ST itself is higher than the priority II of the received signal. This permits the concerned ST itself to preferentially make a request for the sending right combination of codes 51–57 representing a data frame length.

As stated above, the received signal $S_R$ is delayed bit by the FFC 11 in FIG. 3 and the comparison between received signal $S_R$ and a signal from the PSC 37 is made by the EXOR gate 47. In this instance, since the received signal $S_R$ and the signal from the PSC 37 are the same from the first bit of the start flag 51 until the fifth bit of the priority level code, the output of the EXOR gate 47 remains "0". In contrast, when the sixth bit of the priority level code 54 is reached, the received signal $S_R$ represents "0" and the output of the PSC 37 represents "1". Thus, the condition that the priority level of the concerned ST itself is higher holds. As a result, the output of the EXOR gate 47 shifts to "1" as previously described. Thus, the priority level code of the concerned ST itself is transmitted instead of the priority level code of the received signal. Subsequently thereto, the output of the PSC 37 is transmitted in the same manner.

It is to be noted that the delay circuit 46 functions as means which allows timings of the output of PSC 37 and the output of FC 11 to be coincident with each other and the delay time could be set to one corresponding to substantially one bit in this embodiment.

FIG. 4(B) is a timing chart showing changes of a clear signal $\overline{CLR}$, a control signal $S_C$ output from the output Q of the FFC $43_2$, and a preset signal $\overline{PSE}$. It is now assumed that the CPU 21 has decided that the received signal $S_R$ is equal to the priority level code 54 of the sending right request signal, and that the concerned STA itself should also make a request for the sending right. Upon completion of these decisions, the CPU 21 allows the clear signal $\overline{CLR}$ to shift from "0" to "1" to release the reset states of the FFC $43_1$ and $43_2$, and allows the preset signal $\overline{PSE}$ to be in the signalless state of "1". As previously described, the control signal $S_C$ shifts to "1" from the position of the sixth bit of the priority code 54, thus causing the AND gate 44 to be turned on.

When the sending right request signal of the concerned STA itself circulates over the entire transmission paths $2_1$ to $2_4$ via other STs and then is received by the concerned STA itself, the CPU 21 decides that the concerned STA itself can acquire the sending right, allowing the preset signal $\overline{PSE}$ to shift to "0", thus to forcedly set the FFC $43_2$.

In addition, FIG. 4(C) is a timing chart similar to that of FIG. 4(B) in the STA from which the received signal SR is being transmitted. As shown in this timing chart, the clear signal $\overline{CLR}$ is in the signalless state of "1" and the preset signal $\overline{PSE}$ is in the preset state of "0". According to this, the control signal $S_C$ shifts to "1", thereby holding the AND gate 44 to be on to transmit the output of the PSC 37 as the transmission signal $S_S$.

Figure 5:
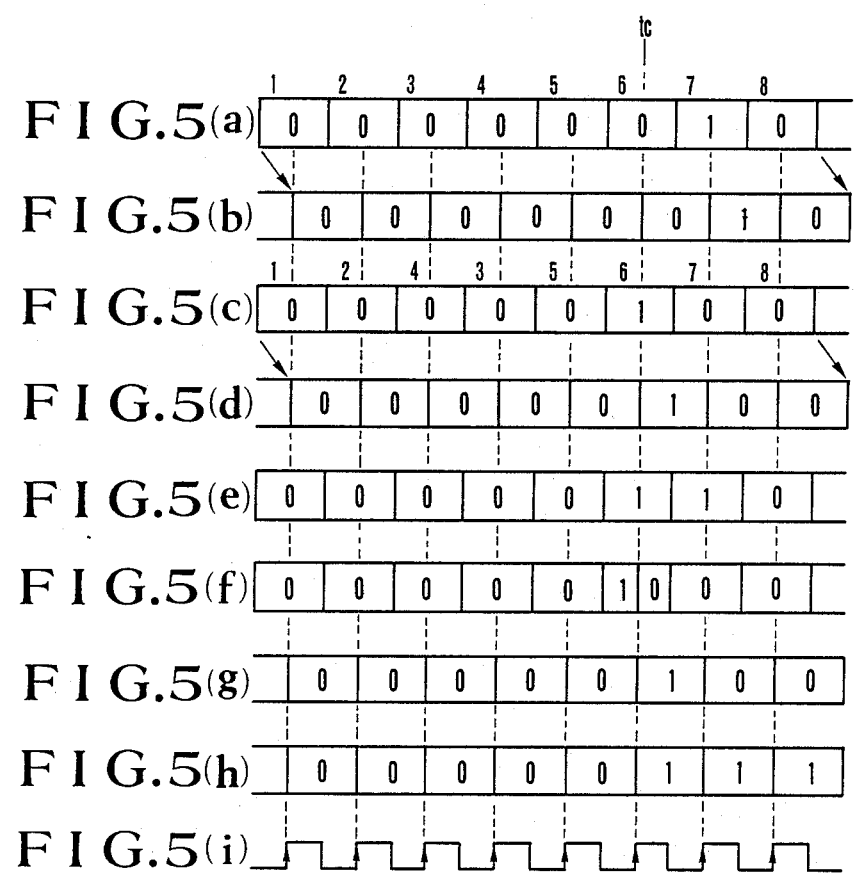
FIGS. 5a to 5i show a timing chart of signals of respective parts of the circuit shown in FIG. 3, FIG. 6 and FIG. 6A are timing charts showing transmission and reception of signals between respective communication equipment, respectively.

FIG. 5 is a timing chart showing signal states of respective components of the STA shown in FIG. 3. In case of FIG. 3, a delay time between FIG. 5(a) and FIG. 5(g) is ½ bit time. When the CLK (i) synchronized with the received signal $S_R$ varies from "0" to "1", the FFC 11 responds to this rising. Accordingly, the output (a) of the ZEL 32 is delayed by the time corresponding to substantially one half of the time period of the clock pulse to serve as the output (b) of the FFC 11. In addition, the output (c) of the PSC 37 is subjected to the delay identical thereto by the delay circuit 46 to serve as an delayed output (d). When the output (e) of the EXOR gate 47 shifts to "1" in accordance with anticoincidence of the both outputs (a) and (c), the output (f) of the AND gate 48 becomes "1" because the FFC is in reset state at that time and therefore its output $\overline{Q}$ is held at "1". In response to the rising of the clock pulse (i) subsequent thereto, the FFC $43_1$ is set at the time $t_c$, thus allowing the outputs Q(g) and $\overline{Q}$ to shift to "1" and "0", respectively.

For this reason the AND gate 48 is immediately cut off, thus returning the output (f) to "0". As a result, the FFC $43_1$ is reset in response to the rising of the next clock pulse (i), thus allowing the output (g) to shift to "0". However, the output (g) is delivered to the clock terminal CK of the FFC $43_2$ and when the output (g) shifts from "0" to "1", the FFC $43_2$ is set in response to the output (c) of "1" delivered to the data terminal D. As a result, the output (h) of the FFC $43_2$ is maintained at "1" at the time subsequent to $t_c$. This output (h) is output to the AND gate 44 and the inverter 45 as the control signal.

Thus, the judgement that the priority level of the concerned STA itself is higher than the received priority level is made as discussed with reference to FIGS. 4(A) and 4(b). In accordance with this judgement, the switch SW is controlled.

Figure 6:
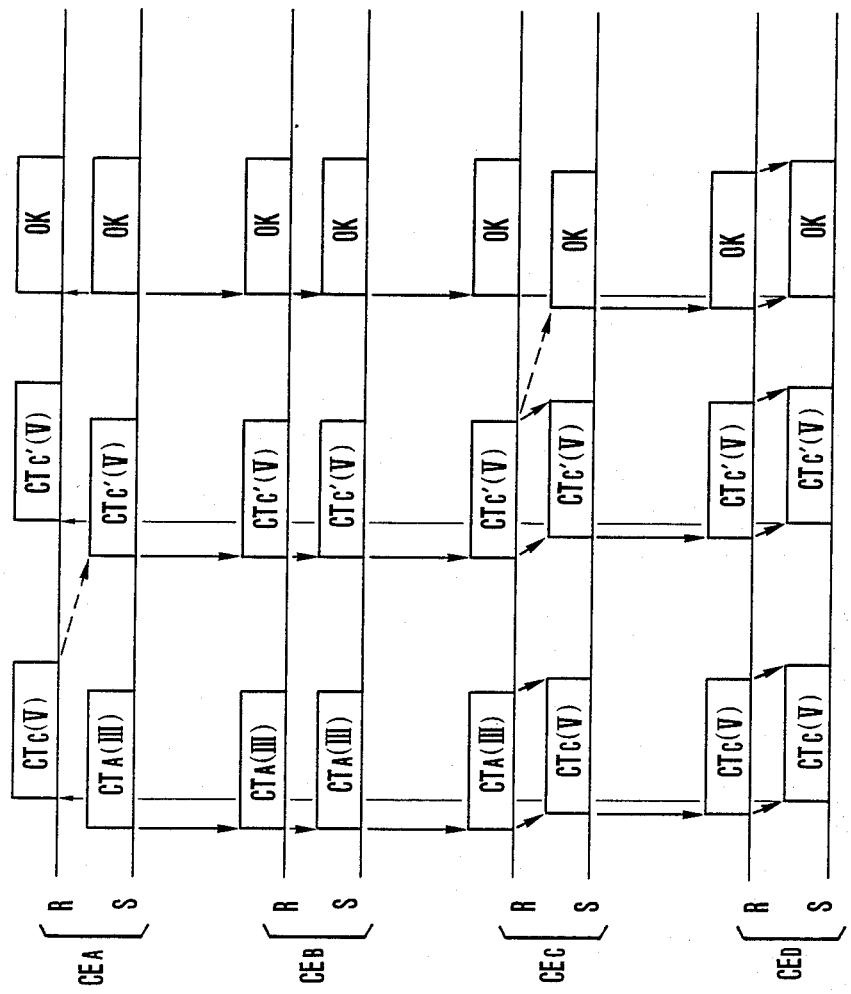
Figure 6A:
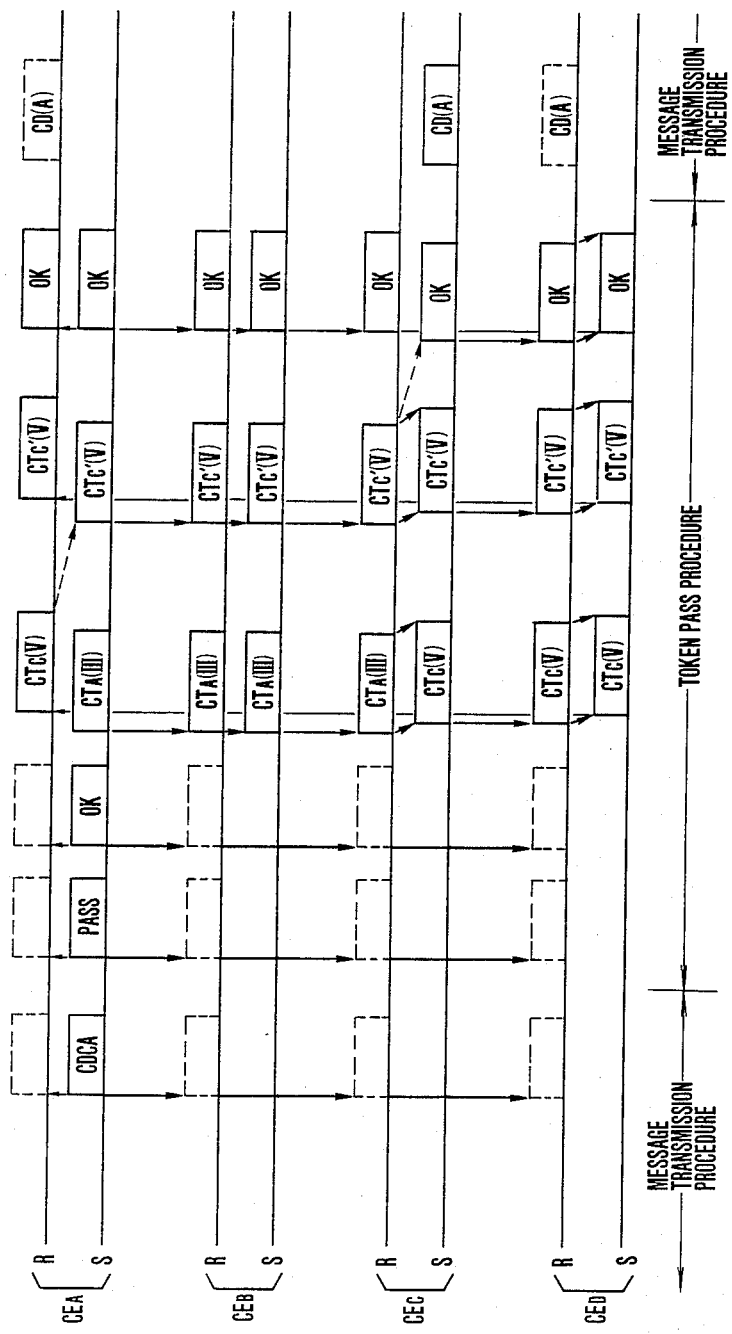

FIG. 6 and 6A are timing charts showing transmission and reception of signals between respective STs in the case where the present system is applied to the technique disclosed in the above-mentioned Japanese patent application No. 59-260800/84. As indicated in FIG. 6A, normally the PASSIVE side of the ACTIVE/PASSIVE SWITCH circuit shown in FIG. 2 is selected in the message transmission procedure. In the token pass procedure, however, the SWITCH circuit at a sub station is on the PASSIVE side for the reception of a PASS signal indicating that a token is now to be transferred and an OK signal which is its recognition signal. In receipt of a PASS signal, the ACTIVE side of the SWITCH circuit is selected at only the sub stations with demands for transmitting messages and the delay circuit acts to delay request signals. First, with a view to further monopolizing the sending right, the STA $CE_A$ which has already had the sending right adds the priority III assigned to itself to a request signal $CT_A$ indicating request for the sending right and transmits the priority-added request signal $CT_A$ by transmission S. The priority-added request signal $CT_A$ is received at the STA $CE_B$ by reception R. Since the station $CE_B$ is in the PASSIVE mode, its prioritized demand signal simply passes through and no delay is caused.

This request signal $CT_A$ is received by the STA $CE_C$. At this STA $CE_C$, the judgement that the priority level assigned to itself is higher than the priority level III of the STA $CE_A$ is made, with the result that the priority level V is added to a request signal $CT_C$. The priority-added request signal $CT_C$ thus obtained is delayed by the time corresponding to substantially one bit and then is transmitted. At the STA $CE_D$, this request signal $CT_C$ is relayed and transmitted as it is by the delay of substantially one bit and then is received at the STA $CE_A$.

Thus, since the request signal $CT_A$ (III) transmitted from the STA $CE_A$ itself is not received, the STA $CE_A$ judges that it should abandon or waive the sending right which it has monopolized until now. Based on this judgement, the STA $CE_A$ accumulates once the received request signal $CT_C(V)$ and then transmits a $CT_C'(V)$ different from the $CT_C(V)$ as a transfer designation signal. When this request signal $CT_C'(V)$ is relayed in turn and is received by the STA $CE_C$, the STA $CE_C$ further transmits it and judges that the sending right has been acquired to transmit a validity signal OK. Then, this signal OK is relayed in turn and circulates over the loop transmission path. Thus, when the validity signal OK can be received by the STA $CE_C$, the STA $CE_C$ considers that the confirmation to the effect that the STA $CE_C$ has possessed the sending right has been made also in other STAs $CE_A$ $CE_B$ and $CE_D$ to enter the transmitting state It is to be noted that the STA $CE_A$ abandons the sending right in response to reception of the validity signal OK after the request signal $CT_C'(V)$ is received again and does not effect re-relaying of the request signal $CT_C(V)$ In addition the STAs $CE_B$ and $CE_D$ respond to the reception of the validity signal OK to confirm that the STA $CE_C$ has acquired the sending right.

According to the foregoing explanation, the station $CE_A$ having the right for transmission transmitted a signal $CT_A$(III) of level (III) priority but a signal of level 0 priority may be transmitted to give another station a priority when there are some stations having messages of the same priority level.

As stated above, by simply effecting delay of substantially one bit, relaying and transmission of the received signal is conducted. This reduces not only time required for relaying to great extent but also times required for relaying of the sending right request signal and for switchover transmission to the transmission right request signal assigned to itself. Thus, the whole transmission speed is improved, and transmission of various kinds of data and control response is realized at a high speed.

The employment of the FFC 11 as the delay element is most suitable because it presents waveform shaping effect as well. However, other elements or circuits may be used. Moreover, the present invention can be modified in various manners, for example, as described below. As long as the delay time is in a range where no hindrance would occur in practical use, even if it is greater or smaller than one bit, the same effects and advantages can be obtained. In FIG. 4(A), codes except for the priority code 54 may be transmitted with the order of bits of each code being inverted.

In addition, since the request signal, the transfer designation signal and the confirmation signal circulate over the entire loop transmission path, the transfer of the transmission right is ensured and a time required for the transfer is reduced.

It is to be noted that so called free token and busy token etc. may be used as the request signal and the transfer designation signal. Essentially, the validity signal OK serves to allow the global signal to be principally received at the entire $STA_S$ (which will be abbreviated as "GLS" hereinafter) to be valid or effective. Accordingly, the same effects can be performed when other signals may be used as the confirmation signal without using the validity signal OK as the same.

It is further to be noted that transmission and reception of the confirmation signal may be omitted. In such a case, it is sufficient to make the confirmation to the effect that the STA $CE_A$ has abandoned the sending right in response to transmission and reception of the transfer signal and the respective $STA_S$ $CE_B$ and $CE_D$ have possessed the transmission right at the CTA $CE_C$.

Figure 7B:
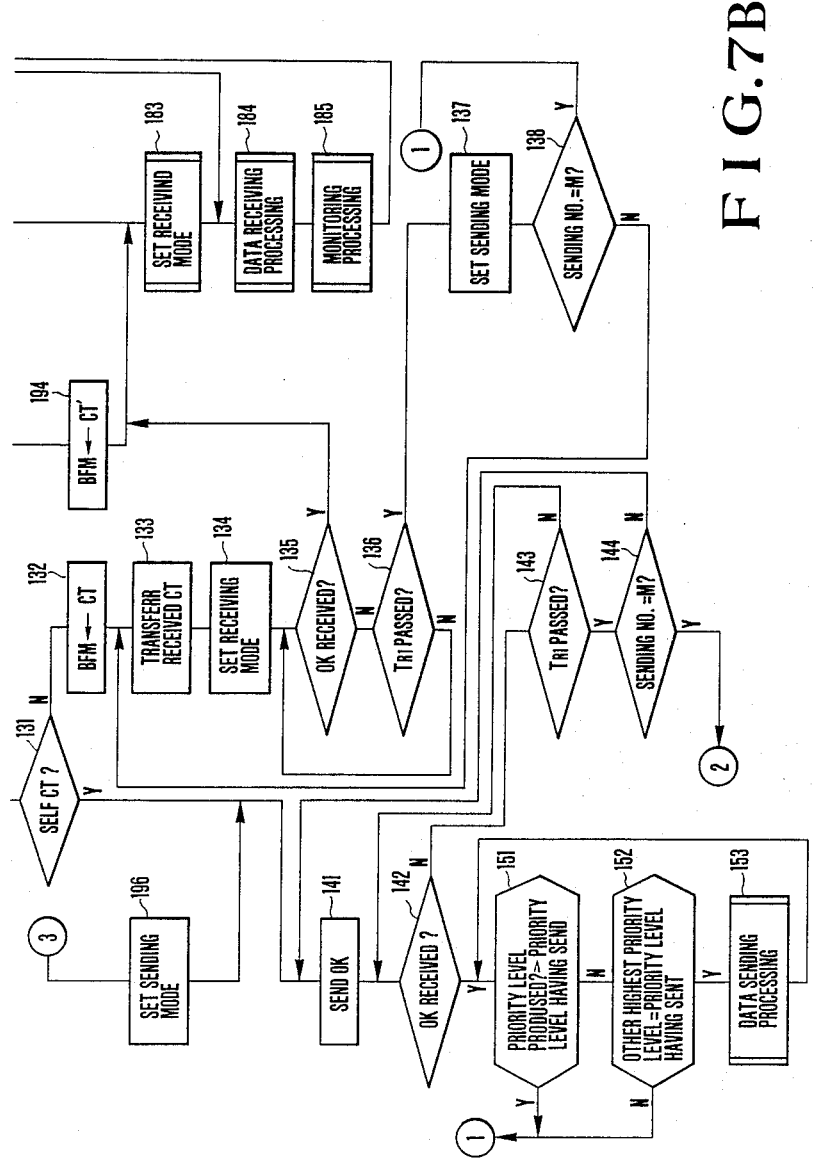

FIG. 7 is a flow chart showing the whole control by the CPU 21 wherein the CPU 21 executes processings at respective steps while accessing a required data to the RAM 22 in accordance with instructions in the ROM 23.

First, at an "initialize" step 101, a judgement whether respective $STA_S$ $CE_A$ to $CE_D$ belong to the primary side having the transmission right or the secondary side having no sending right is made. In accordance with the result of this judgement, the determination of "the primary side?" is conducted at step 102 and each necessary part is cleared.

It is to be noted that the processing at the step 101 is executed in accordance with the power on or recovery of power interruption etc., and that the decision of "the primary side?" is carried out by providing standby times individually determined, for example, in accordance with addresses of the respective $STA_S$ $CE_A$ to $CE_D$, whereby when a signal is not received during the standby time, it is judged that the concerned STA itself has the sending right, whereas when a signal from any other STA is received during the standby time, it is judged that it has no sending right.

When the result of the judgement at the step 102 is Y (YES), the preset signal $\overline{PSE}$ is set to "0" to control the switch SW. After the processing of "set sending mode" at step 111 is executed, the concerned STA selects transmission data having the highest priority level from transmission data retained by the concerned STA itself to transmit a request signal to which the code indicating the highest priority level has been added in the processing of "transmit self-CT" at step 121. Whether or not this is received through the entire transmission path is monitored by step 122 of "CT received?". Thus, while the monitored result is N (NO) and the result of the judgement whether or not a fixed time $TR_1$ set by a timer in the CPU 21 has passed at step 123 of "$TR_1$ passed?" is N, the above-mentioned processings at the step 122 and those subsequent thereto are repeatedly executed. When the judgement result at the step 123 becomes Y by the expiration of the timer, the above-mentioned processings at the step 121 and those subsequent thereto are repeatedly executed through "sending number $=M$?" at step 124 until the maximum repetitive sending number M set by a counter in the CPU 21 is reached. In accordance with the fact that the result of the judgement at the step 124 is Y, the execution shifts to "processing in abnormal condition" at step 125 to output an alarm and display it.

For a time period during which the results of the judgments at the steps 123 and 124 are N, when the result of the judgement at the step 122 becomes N, whether or not the received request signal is identical to the request signal transmitted by the concerned STA itself is judged by step 131 of "self CT?". When the result of the judgement at the step 131 is N, the received request signal is considered to be a request signal from any other ST except for the concerned ST. Thus, the received request signal is stored into a buffer memory BFM defined by using a portion of the memory area in the RAM 22 by a step 132 of "BEM←CT" and is once accumulated therein. Then, the content of the buffer memory BFM is transmitted as a transfer designation signal CT' by step 133 of "transfer received CT" to set the clear signal $\overline{CLR}$ to "0" to execute the processing for "set receiving mode" at step 134. Thereafter, when the result of the judgement whether or not the validity signal OK as the confirmation signal is received is Y, the sending right is abandoned to shift to step 183 of "set receiving mode" which will be described later. In contrast, when the result of the judgement is N, whether or not a fixed time has passed by step 136 of "TR$_1$ passed?" is monitored in a manner similar to the above-mentioned steps 123 and 124. In accordance with the fact that this result becomes Y, transmission mode is set at a step 137 of "set transmission mode" in the same manner as in the step 111. Then, the above-mentioned processings at the step 133 and those subsequent thereto are repeatedly executed through step 138 of "sending number =M?". In accordance with the face that the result of the judgement at the step 136 becomes Y, the execution returns to the step 121.

When the result of the judgement at the step 131 becomes Y, it is considered that the concerned STA has possessed the sending right. The validity signal OK as the confirmation signal is transmitted at step 141 of "transmit OK". In a manner similar to the steps 122 to 124, when the result of the judgement whether or not the validity signal OK is received at step 142 of "OK received?" is N, the above-mentioned processings at the step 141 and those subsequent thereto are repeatedly executed through step 143 for judging whether or not a fixed time TR$_I$ has passed ("TR$_I$ passed?") and step 144 for judging whether or not the maximum repetitive transmission number M is reached ("sending number =M?). In accordance with the fact that the result of the judgement at the step 144 becomes Y, the execution shifts to the step 125.

For a time duration of N at the step 144, if the judgement result at the step 142 becomes Y, the following processings will be executed in the case where transmission data newly occurs. Namely, in order to check whether or not the priority level of the new transmission data is higher than the priority level which has been transmitted as a result of the processing at the step 121, the judgement processing therefor is first executed at step 151 of "priority level which produced > priority which has been already transmitted?". Next, with a view to successively transmitting data of the same priority level, by comparing the highest priority level in other data to be transmitted with the priority level which has been transmitted at the step 121, the judgement processing therefor is executed at step 152 of "other highest priority level=priority level which has been already transmitted?". When the judgement result at the step 152 is N, the above-mentioned processings at the step 121 and those subsequent thereto are repeatedly executed, thus allowing other STA$_S$ to have an opportunity to acquire the transmission right. On the other hand, in accordance with the judgement result Y at the step 151, the above-mentioned processings at the step 121 and those subsequent thereto are repeatedly executed to inform other STA$_S$ that there exists the transmission data having a priority level higher than the previous priority level.

When the judgement result at the step 151 is N and that at the step 152 is Y, the processing at step 153 for "data transmission processing" is executed and the above-mentioned processings at the step 151 and subsequent thereto are repeatedly executed. In this instance, until the judgement result at the step 131 becomes N, the transmission data of the concerned STA itself are transmitted in order of the priority level. On the other hand, when a request signal CT having a higher priority level from any other STA is transmitted, with the result that the judgement result at the step 131 becomes N, and when the judgement result at the step 135 becomes Y, the execution shifts to step 183 for setting receiving mode which will be described later.

In contrast to the above, when the judgement result at the step 102 is N, the clear signal $\overline{CLR}$ is set to "0" to control the switch. Thus, after the processing at step 161 of "set receiving mode" is executed, checking at step 162 for "received data present?" is made. When the result of this checking is Y, the priority level code 54 of the concerned STA and codes subsequent thereto shown in FIG. 4(A) is delivered to the PSC 37, thus to execute the processing at step 163 for "data set to PSC". In accordance with the judgement result of Y at step 171 for judging whether or not a request signal from any other STA is received ("CT received?"), the processing for setting the clear signal $\overline{CLR}$ to "1" is executed at step 172 labeled "$\overline{CLR}$="1" in a manner shown in FIG. 4(B) to monitor whether or not the priority level code 54 and codes subsequent thereto are transmitted in accordance with the output Q of the FFC 43$_2$ and the output of the OR gate 42. At step 181 labeled "self-priority level<received priority level", judgement whether or not the priority level of the concerned STA itself is higher than the received priority is made. When the judgement result at the step 181 is N, it is judged that the sending priority level of the self STA is higher than other sending priority level and the sending right is endowed to itself. However, when the judgement result at the step 181 is Y, it is judged that the transmission right is not endowed to itself. Similarly to the step 161, the receiving mode is set at step 183 labeled "set receiving mode". After "data receiving processing" at step 184 and "monitor processing" at step 185 are executed, the above-mentioned processings at the step 162 and those subsequent thereto are repeatedly executed.

Additionally, when the judgement result at the step 181 is Y, the received request signal CT is only subjected to delay corresponding substantially one bit through the FFC 11, the AND gate 41 and the OR gate 42 and is relayed and transmitted as it is.

On the other hand, when the judgement result at the step 181 is N, the processing for setting the clear signal $\overline{CLR}$ to "0" is executed at step 191 labeled "$\overline{CLR}$="0", thereby to reset the FFSs 43$_1$ and 43$_2$ thereafter to monitor whether or not the transfer designation signal CT' is received at step 192 labeled "CT' received?". In accordance with the judgement result of Y at the step 192, judgement is made whether or not the received signal is the transfer designation signal CT' assigned to itself corresponding to the request signal assigned to itself transmitted for a time period during which the steps 172 to 181 are executed at step 193 labeled "self CT?". When the judgement result at the step 193 is Y, it is judged that the sending right can be possessed. At step 196 labeled "set sending mode", the sending mode is set in the same manner as in the step 111, whereupon the execution shifts to the step 141. In contrast, when the judgement result at the step 193 is N, it is judged that acquisition of the transmission right is impossible. Accordingly, similarly to the step 132, the processing for storing the content of the transfer designation signal into the BFM at step 194 labeled "BFM←CT" is executed, whereupon the execution shifts to the step 183.

While the judgement result at the step 192 is N, whether or not a predetermined time $T_{R2}$ determined so that $T_{R1}<<T_{R2}$ in a manner similar to the step 123 has passed is monitored at step 195 labeled "$T_{R2}$ passed?". While the monitored result is N, the above-mentioned processings at the step 192 and those subsequent thereto are repeatedly executed. On the contrary, when the monitored result is Y, the execution shifts to the step 125.

Figure 8:
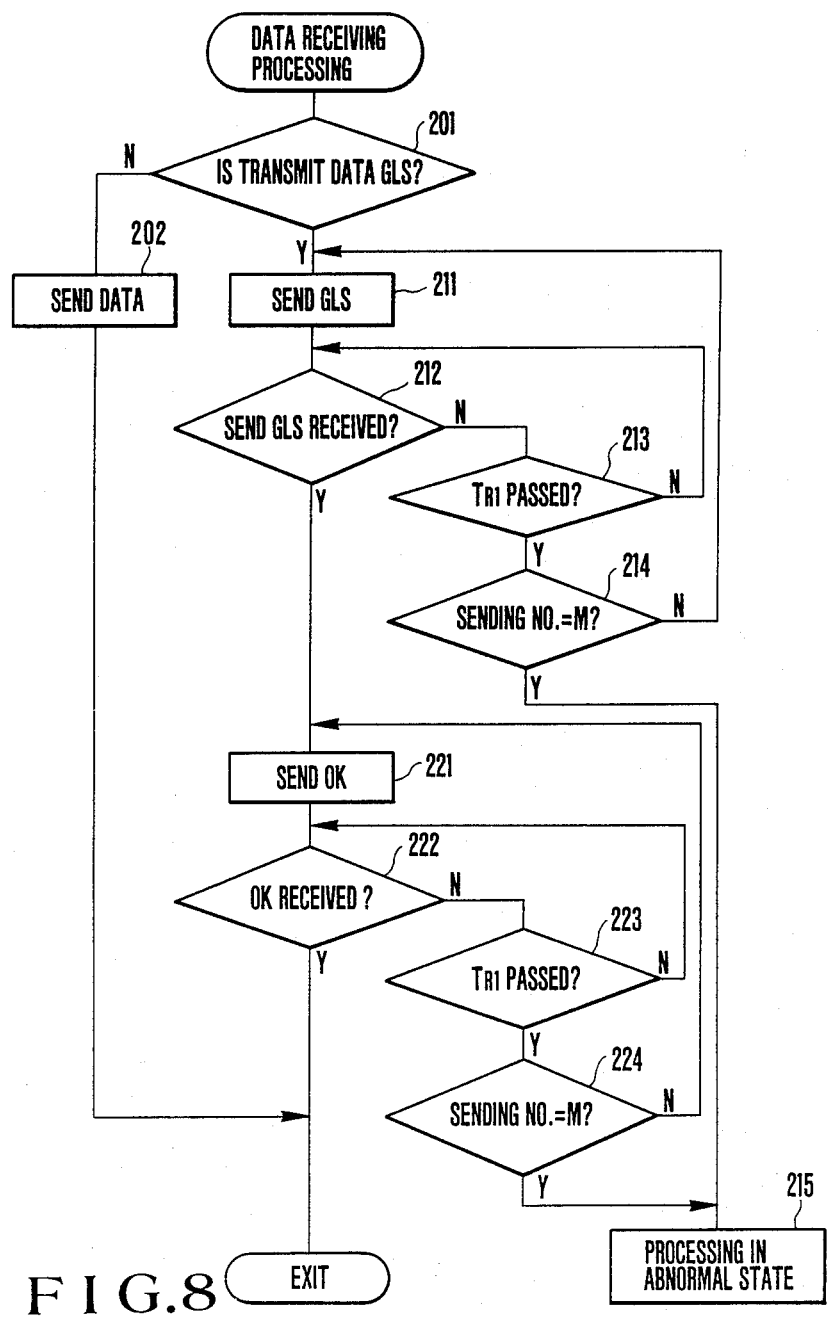
FIGS. 8 to 10 are flow charts showing operations of subroutines shown in FIG. 7, respectively.

FIG. 8 is a flow chart showing the detail of the step 153. At step 201 labeled "is transmission data GLS?", whether or not the transmission data is GLS is judged. When the judgement result at the step 201 is N, only the processing at step 202 labeled "data transmission" is executed. In contrast, when its result is Y, the processing at step 211 labeled "send GLS" is executed, whereupon whether or not the GLS is received through the entire transmission path is monitored by step 212 labeled "transmitted GLS received ?". While the monitored result is N, the above-mentioned processings at the step 211 and those subsequent thereto are repeatedly executed through step 213 labeled "$T_{R1}$ passed?" for judging whether or not a fixed time has passed and step 214 labeled "sending number=M?" for judging whether or not the maximum repetitive transmission number is equal to M in a manner similar to the above-mentioned steps 123 and 124. In accordance with judgement result of Y at the step 214, the processing at step 215 labeled "processing in abnormal condition" is executed similarly to the step 125.

For a time interval during which the judgement result at the step 214 is N, when the judgement result at the step 212 becomes N, whether or not a fixed time $T_{R1}$ has passed is judged at step 223 labeled "$T_{R1}$ passed?" through the processing for transmitting the validity signal OK at step 221 labeled "transmit OK" and the pressing for judging whether or not the validity signal 0K is received at step 222 labeled "OK received". In accordance with the judgement result Y at the step 223, whether or not the maximum repetitive number of M is reached is judged at step 224 labeled "sending number=M?". Until the judgement result at the step 224 becomes Y, the above-mentioned processings at the step 221 and those subsequent thereto are repeatedly executed. Thus, when the above-mentioned result is Y, execution shifts to step 215. For a time period during which the judgement result at the step 224 is N, if the validity signal OK can be received, the judgement result at the step 222 becomes Y.

Figure 9:
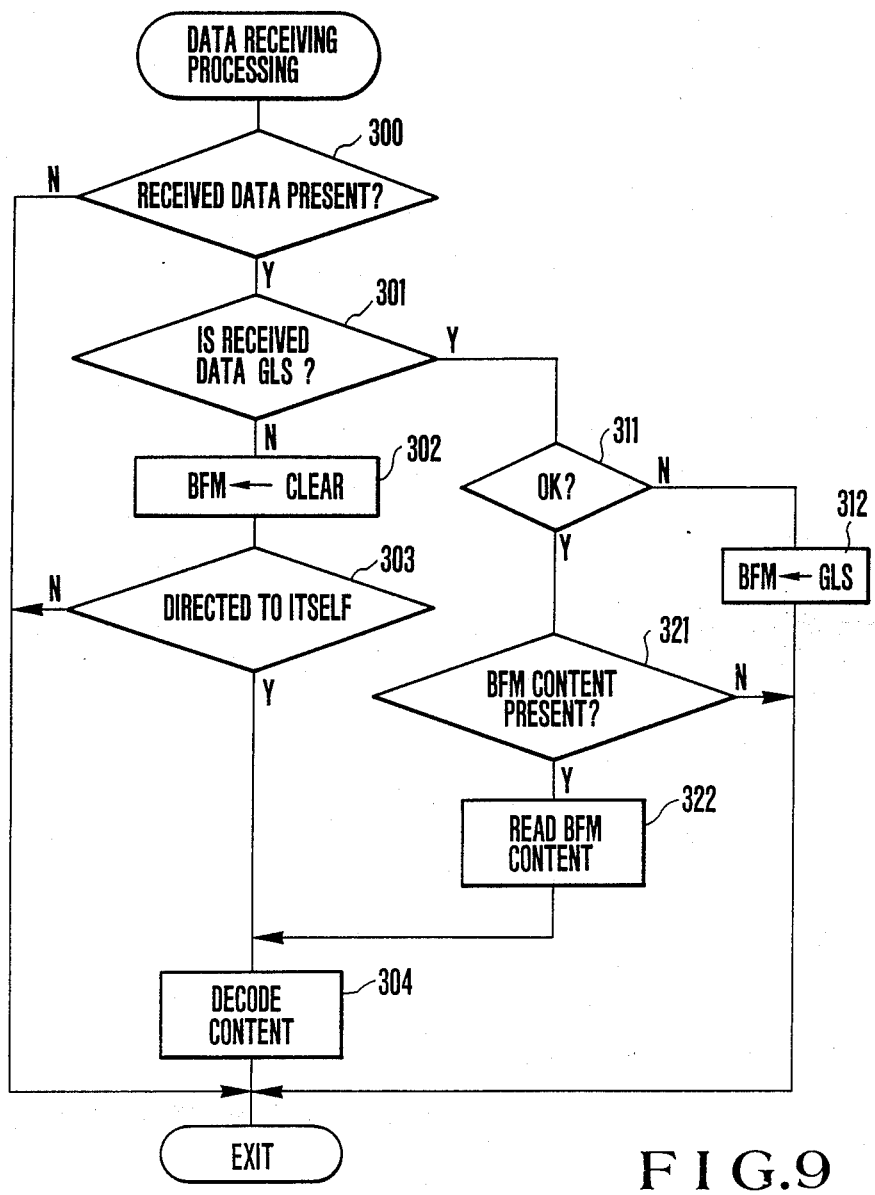

FIG. 9 is a flow chart showing the detail of the step 184. At step 300 labeled "received data present?", whether or not a received data is present is judged. When the judgement result at this step is Y, whether or not the received data is GLS is judged at step 301 labeled "received data GLS?". When the judgement result at this step is N, the processing for clearing the contents of the BFM for GLS is executed at step 302 labeled "BFM←clear". Then, whether or not the received data is directed to the concerned STA itself is checked on the basis of the destination address code added to the received data at step 303 labeled "directed to itself?". When the checked result at this step is Y, the content of the received data is decoded at step 304 labeled "decode content".

On the other hand, when the judgement result at the step 301 is Y, whether or not the content of GLS is validity signal is judged at step 311 labeled "OK?". When the judgement result at this step is N, GLS is stored into the buffer memory at step 312 labeled "BFM←GLS". Then, the above-mentioned processings at the step 162 and those subsequent thereto in FIG. 7 are repeatedly executed. Thus, when the judgement result at the step 311 becomes Y through the judgement results of Y at the steps 300 and 301, whether or not the corresponding content of the BFM is present is checked at step 321 labeled "BFM content present". When the judgement result at this step is Y, the processing for reading the content of the buffer memory BFM at step 322 labeled "read BFM content". Thus, the execution shifts to the step 304.

Figure 10:
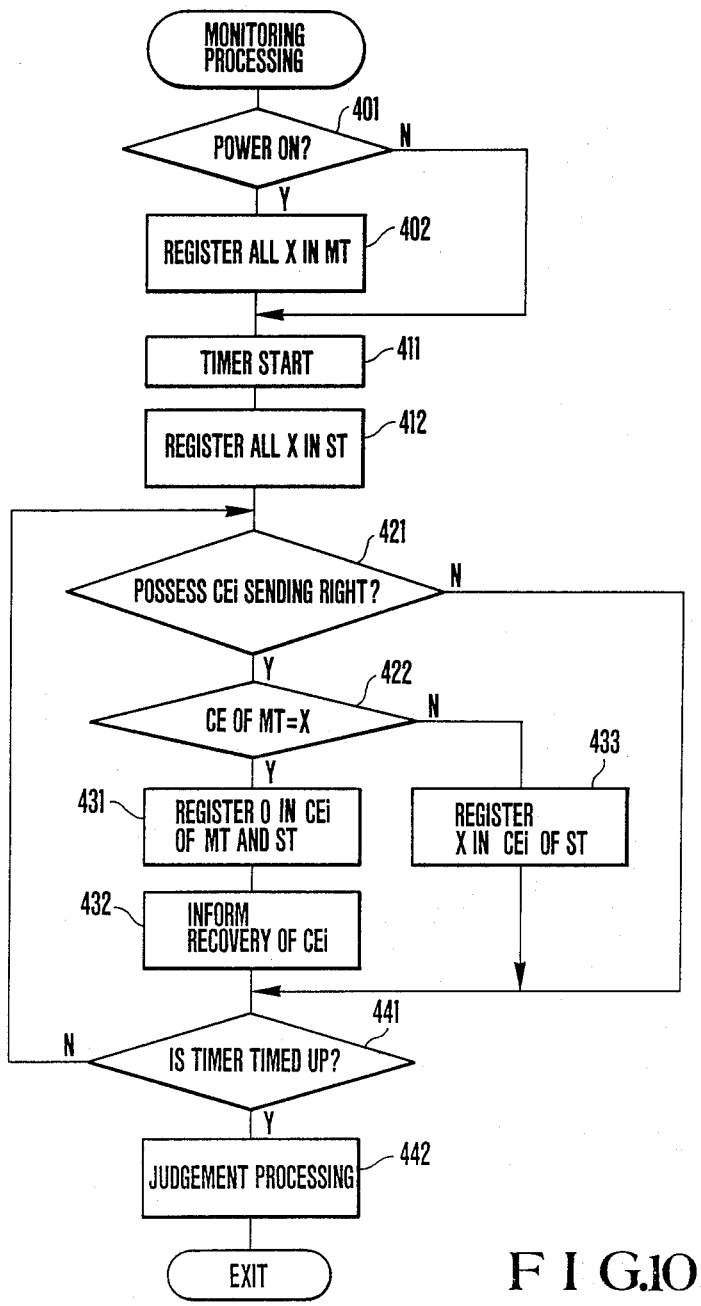

FIG. 10 is a flow chart showing the detail of the step 185. In the RAM 22, main tables and subtables described below are provided as particular areas, respectively, and these tables are used for executing the processing at the step 185.

Namely, the main table (which will be abbreviated as MT) and the subtable (which will be abbreviated as ST) correspond to respective STAs $CE_A$ to $CE_D$. When the operation of each STA is judged to be normal during a fixed monitoring time period, codes marked with a circle are correspondingly stored. In contract, when judged to be abnormal, code marked X are correspondingly stored. Thus, registration is conducted.

TABLE 1

| | MT | | ST |
|---|---|---|---|
| CE | REGISTRATION | CE | REGISTRATION |
| A | X | A | X |
| B | O | B | X |
| C | X | C | X |
| D | O | D | X |

TABLE 2

| | MT | | ST |
|---|---|---|---|
| CE | REGISTRATION | CE | REGISTRATION |
| A | O | A | O |
| B | O | B | X |
| C | X | C | O |
| D | O | D | X |

TABLE 3

| | MT | | ST |
|---|---|---|---|
| CE | REGISTRATION | CE | REGISTRATION |
| A | O | A | O |
| B | X | B | X |
| C | O | C | O |
| D | X | D | X |

It is to be noted that the judgement results during the previous monitoring period are registered as they are in the MT of Table 1 and the MT of Table 3 is used as the MT of Table 1 during the subsequent monitoring period.

As shown in FIG. 10, first is to judge whether or not power is on at step 401 labeled "power ON?". When the judgement result at this step is Y, initialization is executed at step 402 labeled "register all X into MT". After the processing for starting a timer provided in the CPU 21 for regulating a fixed monitoring period at step 411 labeled "timer start", markes X are registered into the ST as shown in Table 1 at step 412 labeled "register all X into ST". Depending upon the judgement result of the step 304, whether or not any STA CEi has possessed the sending right is judged at step 421 labeled "CEi possessed sensing right?". When the judgement result at this step is Y, whether or not the CEi of MT is in abnormal condition is checked at step 422 labeled "CEi of MT=x ?". When the checked result is Y, the processing for registering a circle into the CEi of the MT ST is executed at step 431 labeled "register circle into CEi of MT ST". For instance, when the CEi is $CE_A$, the status as shown in FIG. 2 occurs. Then, recovery of the CEi is informed at step 432 labeled "inform recovery of CEi" by executing the processing to indicate that the STA CEi has recovered from abnormal to normal state, the processing to store a message to the effect that the STA CEi can be selected as the object of communication into the RAM 22, and the like.

On the other hand, when the judgement result at the step 422 is N, mark X is registered into the CEi of the ST at step 433 labeled "register mark X into CEi of ST". For instance, when CEi is $CE_B$, registration as shown in FIG. 2 is carried out. For a time period during which the judgement result at step 441 labeled "timer timed up?" is N, the above-mentioned processing at the step 421 and those subsequent thereto are repeatedly executed. When the judgement result at the step 441 is Y, the judgement processing is executed at step 442 labeled "judgement processing". Then, the above-mentioned operations will be repeated through the processings at the step 162 and those subsequent thereto.

Accordingly, for example, when the STAs $CE_A$ and $CE_C$ acquire the sending right in turn and the STAs $CE_B$ and $CE_D$ do not carry out this acquisition, there occurs status as shown in Table 2. By the execution of the processing at the step 442, the contents of the MT which has indicated the previous result in a manner shown in Table 1 are finally updated, resulting in the status shown in FIG. 3.

Namely, the contents of the Table described below are executed at the step 422.

TABLE 4

| MT | ST | Contents to be executed |
|----|----|-------------------------|
| O  | O  | Not respond |
| O  | X  | Mark X is registered in MT to inform occurence of abnormal state |
| X  | O  | { This cannot occur in this step, and hence will be processed at step 431 } |
| X  | X  | Not respond |

Additionally, the occurrence of abnormal state is informed by executing, in a manner similar to the step 432, the processing to indicate it, the processing to store a message to the effect that this STA cannot be selected as the object to communicate with, and the like.

Accordingly, by allowing all of STAs $CE_A$ to $CE_D$ or at least plural STAs to carry out the above-mentioned operation, abnormal state can be judged on the basis of comparison at the time of "X registration" in Table 4. Then, each concerned STA is informed of occurrence of abnormal state and is also informed of recovery to normal state. Since such an operation is carried out in each STA, even if any STA loses the monitoring function, the whole monitoring function is not lost, with the result that reliability of the entire system is improved.

It is to be noted that the processing at the step 431 may be restricted to that of only ST to include instead the registration of circle of MT in the step 442, and similarly the processing at the step 432 may be included in the step 442. Also in these modified processings, the same advantages can be obtained.

As stated above, the sending right transfer system according to this embodiment can directly reduce the time required for relaying of each signal and for switchover sending of the priority request signal, resulting in improvement in the entire transmission speed. Further, this system can ensure transfer of the sending right and confirmation of the acquisition thereof by the minimum transmission and reception as required and accurately monitor the operation of each STA, thus enabling realization of high response and high reliability in the data transmission and the control thereof.

The priority level may be determined by adding to each sending data a code indicating the degree of importance assigned thereto. The degree of the priority is not limited to (I) to (V) shown in the embodiment, but may be arbitrarily determined according to conditions. When all STAs except for the STA which has the sending right are concurrently designated by the destination address code of the data signal, each STA designated may maintain the receiving mode.

In addition, when the validity signal OK as the confirmation signal is omitted, the request signal CT as the transfer signal may be used in stead of each step in FIGS. 7 to 10 in regard to the validity signal OK.

What is claimed is:

1. In a data transmission system comprising a unidirectional loop transmission path to which a plurality of communication equipments are coupled, each communication equipment operating to relay and send a signal including a data signal received from other communication equipment located upstream to those located downstream via said transmission path, an arbitrary communication equipment which operates to request a sending right via a sending right request signal and adds a code indicating a priority level of said sending right to the sending right request signal and sends said sending right request signal to which said priority level code has been added;

the improvement wherein each communication equipment includes circuit means which receives the sending right request signal and starts resending said sending right request signal before the reception of the last bit of said sending right request signal is completed, and wherein each arbitrary communication equipment requesting said sending right activates its said circuit means and said circuit means operates to compare the received priority level code with the priority level code of said arbitrary communication equipment itself to send said sending right request signal, including said priority level code of said arbitrary communication equipment itself, instead of said sending right request signal including said received priority level code, when the priority level of said code of said communication equipment itself is higher than that of the code of said received signal.

2. A data transmission system as set forth in claim 1, wherein said circuit means sends out address data and other data in addition to the priority level code of said arbitrary communication itself.

3. A data transmission system as set forth in claim 1, wherein said circuit means comprises a delay element to perform the delaying function thereof, an output of said delay element being connected to said transmission path routed to the communication equipment located downstream, and a switchover circuit responsive to a control signal when the priority level of said arbitrary communication equipment itself is higher than that of the code added to said received signal to switch said output of said delay element to a sending output of said arbitrary communication equipment itself to connect said sending output to said transmission path routed to said communication equipment located downstream.

4. A data transmission system as set forth in claim 3, wherein the sending operation of said priority level code of said arbitrary communication equipment itself is performed by effecting control of said switchover circuit.

5. A data transmission system as set forth in claim 1, wherein, upon completion of the sending of said priority level code thereof, a subsequent sending operation is conducted from said arbitrary communication equipment.

6. A data transmission system as set forth in claim 1, wherein when said received sending right request signal is different from that of the communication equipment itself which already possesses the sending right, said last mentioned communication equipment sends a transfer designation signal indicating a communication equipment which will next possess the sending right in accordance with said sending right request signal, and wherein other communication equipment relay and send said transfer designation signal, and said communication equipment which will next possess said sending right responds to reception of said transfer designation signal to possess said sending right.

7. A data transmission system as set forth in claim 1, wherein when said received sending right request signal is different from that of the communication equipment itself which has already possessed the sending right, said last mentioned communication equipment sends a transfer designation signal indicating a communication equipment which will next possess the sending right in accordance with said sending right request signal, and abandons said sending right after said transfer designation signal is sent, wherein other communication equipment relay and send said transfer designation signal, and wherein said communication equipment which will next possess said sending right responds to reception of said transfer designation signal to possess said sending right.

8. A data transmission system as set forth in claim 1, wherein when said received sending right request signal is different from that of the communication equipment itself which has already possessed the sending right, said last mentioned communication equipment sends a transfer designation signal indicating a communication equipment which will next possess the sending right in accordance with said sending right request signal, and abandons said sending right after said transfer designation signal is sent, wherein other communication equipment relay and send said transfer designation signal, wherein said communication equipment which will next possess said sending right responds to reception of said transfer designation signal to send a validity signal, and wherein said other communication equipments relay and send said validity signal and identify said communication equipment which possesses said sending right.

9. A data transmission apparatus comprising:
(a) a unidirectional loop transmission path,
(b) a plurality of communication equipments coupled to said loop transmission path,
(c) each communication equipment comprising a main unit including a processor for transmission control, an interface coupled between said main unit and said transmission path, and an output control circuit responsive to an output of said interface to control sending operation under supervision of said processor provided in said main unit, thereby to relay and send a signal received from other communication equipment located upstream to those located downstream via said transmission path, said processor having a function to respond to a request for a sending right to send a sending right request including a code indicating priority level of said sending right at said interface,
(d) said output control circuit including circuit means which services the sending right request signal and starts resending said sending right request signal before the reception of the last bit of said sending right request signal is completed, and which responds to the request for the sending right to compare the received priority level code from said other communication equipments with the priority level code of the communication equipment itself to send said priority level code including said priority level code of said communication equipment itself, instead of said sending right request signal including said received priority level code, when the priority level of said code of said communication equipment itself is higher than that of the code of said received signal.

10. A data transmission apparatus as set forth in claim 9, wherein said circuit means comprises a delay element to perform the delaying function thereof, an output of said delay element being connected to said transmission path routed to the communication equipment located downstream, and a switchover circuit responsive to a control signal when the priority level of said arbitrary communication equipment itself is higher than that of the code added to said received signal to switch said output of said delay element to a sending output of said arbitrary communication equipment itself to connect said sending output to said transmission path routed to said communication equipment located downstream.

11. A data transmission apparatus as set forth in claim 9, wherein said main unit further includes a fixed memory in which instruction for transmission control are stored, and a variable memory, said processor operating to read a required instruction from said fixed memory into said variable memory, thus to effect a predetermined processing required for transmission and reception.

12. A data transmission apparatus as set forth in claim 10, wherein said interface includes, a "0" bit deletion circuit for deleting one "0" bit from said received signal to deliver the "0" bit deleted signal to said processor through a serial-to-parallel converter and directly to said output control circuit, and a parallel-to-serial converter at which the priority level code of said sending right is set by said processor, said priority level code being delivered to said output control circuit, and a "0" bit insertion circuit for inserting one "0" bit into a sending signal from said output control circuit.

13. A data transmission apparatus as set forth in claim 12, wherein said output control circuit further comprises a delay circuit which delays an output of said parallel-to-serial converter by a time corresponding to one bit, and an anticoincidence detector for comparing a priority level code from said parallel-to-serial converter with a priority level code of said received signal from said "0" bit deletion circuit.

14. A data transmission apparatus as set forth in claim 13, wherein said output control circuit further comprises another circuit for delaying an output of said anticoincidence detector to deliver the delayed output to said switchover circuit.

15. A data transmission apparatus as set forth in claim 10, wherein said delay element is comprised of a flip-flop.

* * * * *

UNITED STATES PATENT AND TRADEMARK OFFICE
CERTIFICATE OF CORRECTION

PATENT NO. : 4,860,000
DATED : 8/22/89
INVENTOR(S) : Kobayashi

It is certified that error in the above-identified patent and that said Letters Patent is hereby corrected as shown below:

| col. 04, line 22 | delete "or"    | insert --For-- |
| col. 06, line 10 | after "ZIS"    | insert --38--  |
| col. 06, line 21 | before "and"   | insert --44--  |
| col. 09, line 36 | after "(V)"    | insert --.--   |

Signed and Sealed this

Fourteenth Day of May, 1991

Attest:

HARRY F. MANBECK, JR.

*Attesting Officer*          *Commissioner of Patents and Trademarks*